Sept. 13, 1960     I. H. SUBLETTE ET AL     2,952,838
METHOD OF AND DEVICE FOR INTEGRATING SIGNALS
Filed Jan. 31, 1955
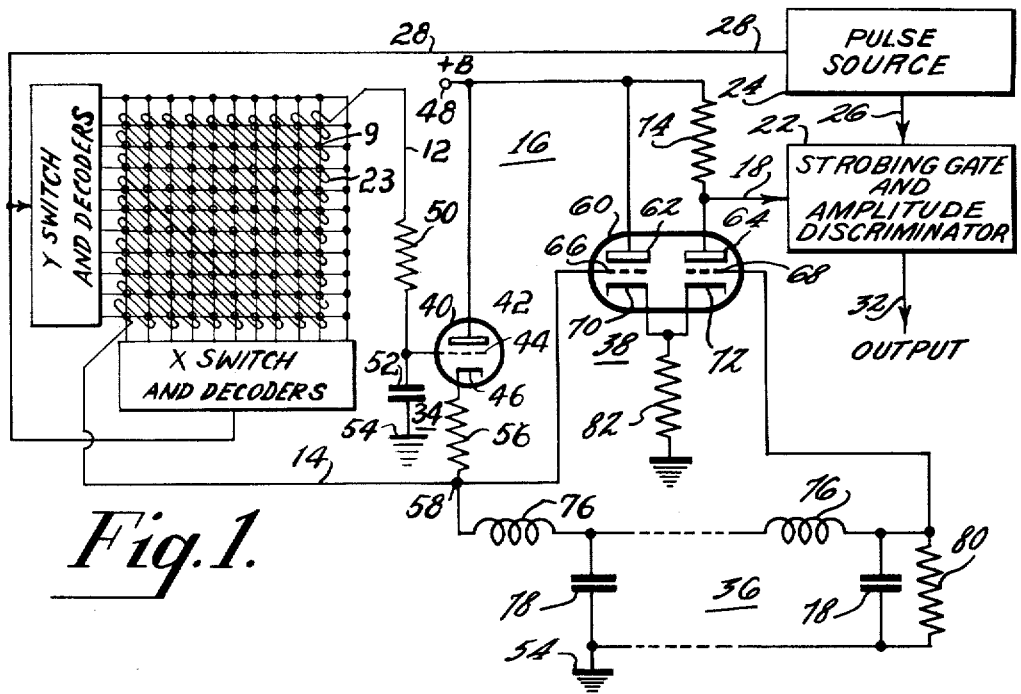
Fig. 1.
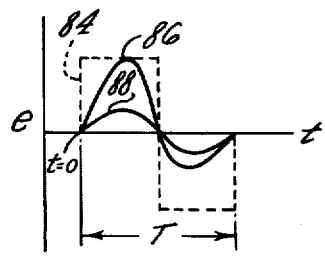
Fig. 2.
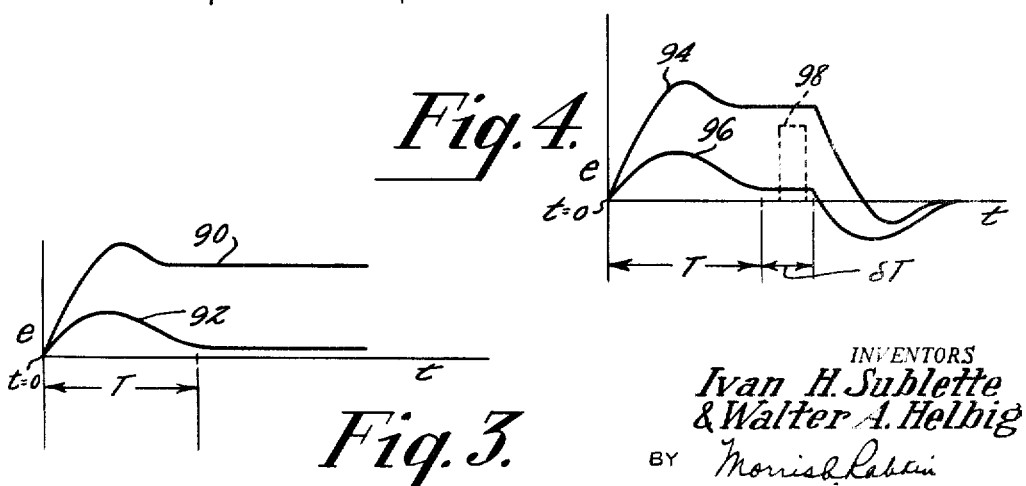
Fig. 4.
Fig. 3.
INVENTORS
Ivan H. Sublette
& Walter A. Helbig
BY Morris ?
ATTORNEY.

United States Patent Office
2,952,838
Patented Sept. 13, 1960

2,952,838

METHOD OF AND DEVICE FOR INTEGRATING SIGNALS

Ivan H. Sublette and Walter A. Helbig, Haddonfield, N.J., assignors to Radio Corporation of America, a corporation of Delaware Filed Jan. 31, 1955, Ser. No. 484,883

9 Claims. (Cl. 340—172.5)

This invention relates to methods of and means for providing output signals corresponding to the integral of an electrical input signal.

There are many applications in the field of electronics wherein it is desirable to integrate electrical signals, such as pulses or continuous waves, as the case may be. Further, it is often necessary to make amplitude comparisons and other quantitative or qualitative comparisons of a succession of these integrated signals. It is not unusual in applications of this type to be dealing with successions of signals having a rapid repitition rate. In such cases, it is not always sufficient to connect an amplitude discriminator to the output of the integrating circuit. Such an arrangement would tend to produce a summation integrated output, that is, an output representative of the entire history of the succession of signals. Often, the desired integrated output is that for the present signal (cycle) only.

To correct this situation, many systems of the prior art have employed circuitry to return the integrated output to a quiescent, that is, zero condition, after each input cycle. The specific circuitry utilized have included clamping circuits, which require critical synhronizing circuits, as well as other relatively expensive and complex equipment.

Accordingly, it is an object of this invention to provide an improved device for integrating input signals which device will provide a quiescent output upon the cessation of each input signal, yet requires less circuitry than that heretofore employed for the purpose.

Another object of this invention is to provide a method for integrating a succession of input pulses which method will provide an integrated output accurately representing each individual pulse.

A further object of this invention is to provide an improved circuit for accurately integrating each pulse of a succession of pulses which circuit is more conservative of equipment than those heretofore known.

Still another object of this invention is to provide an improved circuit for integrating the reading signal from a coincident current memory, which circuit is more conservative of apparatus than those heretofore known.

An additional object of this invention is to provide an improved integrating device for integrating and amplifying the output of the reading coil from a coincident current memory which device will return to a quiescent output condition after each readout.

In accordance with the invention, signals to be integrated are coupled to the input of an integrator. The output of the integrator is connected directly to one input of a differential amplifier and through a delay line to the other input of this differential amplifier. Strobing of the output of the differential amplifier will provide an accurate integrated signal. The output of the differential amplifier is then automatically returned to a quiescent condition upon the cessation of each input signal preparatory to the receipt of the next signal.

Further objects of this invention as well as a better understanding thereof will become apparent from the following description considered in conjunction with the drawings, in which:

Figure 1 is a schematic drawing of a preferred embodiment of an integrating circuit, in accordance with this invention.

Figure 2 displays the wave shapes of reading signals as they are obtained from a coincident current memory in accordance with a preferred application of this invention.

Figure 3 displays the wave shapes illustrated in Fig. 2 integrated by the boot strap amplifier employed in Figure 1.

Figure 4 displays the integrated wave shapes illustrated in Figure 3, differentially amplified by the differential amplifier employed in Figure 1.

The integrating and amplifying circuit about to be described may find utility in many applications such as television, radar, communications, or wherever it becomes necessary to individually integrate successive signals and amplitude discriminate the result. This invention has found particular utility in the field of coincident current memory systems. One coincident current magnetic memory system has been described in an article entitled "A Myriabit Magnetic Core Matrix Memory," by Jan Rajchman, in volume 41 of the Proceedings of the I.R.E.

In Figure 1 there is shown a magnetic core memory and associated logic and switching circuitry. By way of example, the memory may be similar to that set forth in the article by Rajchman previously referred to, and may include suitable logic control and associated switching circuitry, also described in the Rajchman article. The two leads 12, 14 represent the output leads of the memory reading winding 23 coupled to every core 9 in the memory. This reading winding output is coupled to the input of an integrating circuit 16.

The output on the lead 18 of the integrating circuit 16 is connected to the signal input of a strobing gate and amplitude discriminator represented by the rectangle 22. Strobing gates and amplitude discriminators of this type are known in the art. By way of example, a suitable strobing gate is described in some detail on page 374 of the book on "Waveforms" by Chance et al., volume 19, M.I.T. Radiation Labs Series. The gating, that is, strobing, pulse is provided by a pulse source represented by a rectangle 24. The pulse source 24 has two outputs indicated by the two leads 26, 28. The first output 26 is connected to the gating input of the strobing gate 22. The second output 28 of the pulse source 24 is connected to the switching circuitry for the magnetic matrix 10. The output on the lead 32 of the strobing gate and amplitude discriminator 22 is connected to whatever utilization device with which, in conjunction, the memory 10 is to be used. A specific utilization device may, for example, be a computing system.

The integrating circuit 16 comprises an integrator 34, a delay network 36, and a differential amplifier 38. The integrator 34 functions so that a change in output is insensitive to the absolute voltage on the integrating capacitance. One such integrator which has proven extremely advantageous in providing accurate results is the "Bootstrap Integrator," which is shown in detail in Fig. 1. The bootstrap integrator 34 may comprise a vacuum tube 40 having a plate 42, a grid 44, and a cathode 46. The plate 42 is connected to a source of B+ potential 48.

One lead 12 from the memory readout winding 23 is connected through a resistance 50 to the grid 44 of the boot strap integrator 34. The grid 44 is in turn connected through a condenser 52 to a point of reference potential 54, indicated as ground. Finally, the cathode 46 is connected through a cathode resistor 56 to a junction point 58. Also connected to this junction point 58 is the second lead 14 from the magnetic matrix readout winding 23. The differential amplifier 38 may be any suitable type. By way of example, several suitable differential amplifiers are described in the book entitled "Vacuum Tube Amplifiers," by Valley and Wallman, volume 18, M.I.T. Radiation Labs Series, section 11–10. However, one differential amplifier which has been found particularly useful in conjunction with the bootstrap integrator is shown in Figure 1.

Thus in a preferred embodiment, the differential amplifier 38 of Fig. 1 comprises a vacuum tube 60 having two plates 62, 64, two grids 66, 68, and two cathodes 70, 72. The left hand plate 62 is connected directly to the source of B+ potential 48. The right hand plate 64, however, is connected through a resistance 74 to the source of B+ potential 48. The output 18 of the differential amplifier, which is the output of the integrating circuit 16, is taken from the right hand plate 64. The junction point 58 in the cathode circuit of the boot strap amplifier is connected directly to the left hand grid 66 of the differential amplifier 38 and through the L section delay network 36 to the right hand grid 68 of the differential amplifier 38. This L section delay line (network) 36 comprises a number of serially connected inductances 76 and shunt capacitances 78 and is of a type well known in the art. The delay line 36 is terminated by a terminating resistance 80 and returned to ground 54. The cathodes 70, 72 of the differential amplifier 38 are joined together and connected through a resistance 82 to ground 54.

In operation, signals, in this case reading signals from the coincident current memory 10, are applied via readout winding 23, to the inputs 12, 14 of the integrating amplifier 16. Assuming the memory to be of the magnetic core type as described in the Rajchman article, the memory interrogating pulses are usually such as to put the cores through a complete hysteresis loop. In this manner, an accurate signal indicative of the core condition may be obtained by integrating the reading signal from the memory as is described in the Rajchman article.

In describing the operation of the integrating circuit, it is convenient to assume that the reading program consists of a single positive interrogating pulse followed by a single negative interrogating pulse as illustrated by the dotted line 84 of Figure 2. Depending upon the polarity of the interrogated core, the resulting signal in the memory readout winding will represent either a "one" herein illustrated by waveform 86 or a "zero" herein illustrated by waveform 88 as shown in Figure 2. From the voltage-time display of Figure 2, note that there is enclosed between the "one" output waveform 86 of any given core and the time axis, a large positive voltage-time area. On the other hand, there is enclosed between the reading signal 88 resulting from the "zero" core condition and the time axis positive and negative areas which are very nearly equal. The polarities herein selected are relative only, and dependent upon the particular pulse interrogation program to be followed. Thus, the signals may be reversed in polarity, for the particular polarities are immaterial as to the operation of this integrating circuit. The time required for the complete reading output from the memory to occur and return to a quiescent condition has been designated as time T. This time T may be defined as that time required for substantially all of the cores in the coincident current matrix memory to traverse the closed minor hysteresis loop mentioned in the said Rajchman article.

These memory output signals upon being applied to the grid of the boot strap integrator are integrated to produce "one" 90 or "zero" 92 outputs as shown in the voltage-time display of Figure 3. The particular operation of the boot strap integrator is well known in the art and has been described on page 37 of the book on "Waveforms" cited above. The primary advantage of the boot strap integrator lies in the fact that the change in output voltage in a cycle is insensitive to the absolute voltage on the integrating capacitor. Hence, carry over on the integrating capacitor, rectified bias, and the like factors do not adversely affect the operation. This integrated output, whether it be "one" or "zero," is applied directly along one path to the grid 66 of the differential amplifier 38, which begins to amplify the signal to produce outputs as shown in the voltage-time display of Figure 4.

The application of the integrated "one" output, waveform 90, directly to the left grid 66 of the differential amplifier 38 causes an output from the differential amplifier 38 to appear on lead 18, which output is illustrated by waveform 94 of Figure 4. This output, of course, reaches a stable level in time T. This integrated output waveform 90 from the boot strap integrator 34 is also applied through the L section delay line 36 to the right hand grid 68 of the differential amplifier 38. This delay line 36 is constructed to delay the integrated waveform $T+\delta T$ micro-seconds, where $\delta T$ is some additional time duration which may be, in the present example, of the order of one microsecond. The application of this delayed waveform to the difference amplifier 38 results in returning the output waveform 94 of the difference amplifier to zero as is indicated in Figure 4. The output waveform 94 of the difference amplifier is strobed (dotted pulse 98) by the strobing gate 22 to sample the output signal during the time $\delta T$. In this manner, the circuit is able to detect the "one" output condition and return itself to a zero output within a period of time slightly in excess of three interrogating pulse lengths 84.

Let us next consider the action of the differential amplifier upon the "zero" integrated output 92. When a "zero" input is applied to the differential amplifier 38, the differential amplifier produces an amplified output waveform 96 which during time $\delta T$ still has a slight positive value. Immediately after time $\delta T$ the delayed integrated output 92 (Fig. 3) from the delay line 36 arrives at the right grid 68 of the difference amplifier 38. The arrival of this delayed waveform results in returning the output of the difference amplifier substantially to a quiescent, that is, zero output condition. The return to zero in this "zero" case occurs within a period of time of four interrogating pulse lengths. Strobing of the output occurs during time $\delta T$ as previously described.

The strobed output of the differential amplifier is now passed through an amplitude discriminator, which passes signals exceeding predetermined amplitude and blocks other signals. The passed signals are applied to utilization circuitry, such as a computer, in conjunction with which the memory is used.

Thus it is apparent that a particular advantage of this circuit in conjunction with a coincident current memory is that the output of the differential amplifier is returned to the zero state shortly after each readout occurs. Because of this return to zero, the amplitude discriminator is able to detect the change in integrated output for only the present cycle. Additional clamping circuitry coupled to the integrator output to effect this return to zero is not required. If the output of the integrator (from the differential amplifier) were not returned to zero, the output of any given readout cycle would not only include the output for the present core being interrogated, but the output of the entire history of the memory. This combination or summation of previous cycles would soon result in the amplitude discriminator detecting zeros for ones due to the increased amplitude of the output signal.

In the coincident current memory application as well as the many other applications, the delay line may be varied in length depending on the particular time length of the signals to be integrated.

There has been described a simple, accurate, integrating circuit which employs a minimum of circuitry, and returns its output to a quiescent condition upon the cessation of each input signal.

What is claimed is:

1. The combination with a magnetic memory of the type having (1) a plurality of magnetic cores, each core being capable of representing a bit of information by the polarity of its state of magnetic saturation, (2) a reading winding coupled to the cores of said memory, and (3) means to selectively excite these individual cores by at least a single current pulse to produce a reading signal indicative of said core state of saturation on said reading winding, of a reading circuit comprising means to integrate said reading signal, means to delay in time a signal, differential amplifying means connected to receive the output of said integrating means both directly and through said time delay means to provide an output indicative of said core state of saturation, the output of said differential amplifying means returning to a quiescent condition upon the completion of said reading signal.

2. The combination with a magnetic memory of the type having (1) a plurality of magnetic cores, each core being capable of representing a bit of information by the polarity of its state of magnetic saturation, (2) a reading coil coupled to the cores of said memory, and (3) means to selectively excite these individual cores by at least a single current pulse to produce a reading signal indicative of said core state of saturation on said reading coil, of a device for reading and amplifying said reading signal comprising integrating means coupled to the output of said reading coil, a delay network coupled to the output of said integrating means, differential amplifier means coupled to receive the outputs of said integrating means and of said delay network to provide an output indicative of said reading signal, the output of said differential amplifier means being restored to zero after each of said reading signals has ceased.

3. The combination with a magnetic memory of the type having (1) a plurality of magnetic cores, each core being capable of representing a bit of information by the polarity of its state of magnetic saturation, (2) a reading winding coupled to each core of said memory, and (3) means to selectively excite these individual cores by at least a single current pulse to produce a reading signal indicative of said core state of saturation on said reading winding, of a circuit comprising integrating means coupled to the output of said reading winding, a differential amplifier having a first input and a second input, said first input being coupled directly to the output of said integrating means, and a delay network coupled between the output of said integrating means and said second input to produce an output in response to said reading signal indicative of the condition of said cores.

4. The combination with a magnetic memory of the type having (1) a plurality of magnetic cores, each core being capable of representing a bit of information by the polarity of its state of magnetic saturation, (2) a reading coil coupled to each core of said memory, and (3) means to selectively excite these individual cores by at least a single current puse to produce a reading signal indicative of said core state of saturation on said reading coil, of a reading circuit comprising at least an integrating circuit coupled to the output of said reading coil to integrate said reading signal, a differential amplifier having a first input and a second input, said first input being coupled to the output of said integrating circuit, a delay line coupled between the output of said integrating circuit and said second input to effect a time delay in said integrated reading signal of duration in excess of the time duration of said reading signal, the output of said differential amplifier being restored to zero after each reading signal is completed.

5. A circuit as claimed in claim 4 wherein said integrating circuit comprises a boot strap integrator.

6. A circuit as claimed in claim 5 wherein said delay line comprises a part of a cathode load for said boot strap integrator.

7. In a device for reading a reading signal from a coincident current memory, the combination of means to integrate said reading signal, means to differentially amplify two signals, means to effect a time delay upon a signal, means to apply the output of said integrating means (1) directly to said differential amplifying means, and (2) through said time delay means to said differential amplifying means to cause the output of said differential amplifying means to return to a quiescent condition after a time interval $\Delta T$ after the cessation of said reading signal, and a strobing gate coupled to the output of said differential amplifying means for sensing said output during the interval $\Delta T$.

8. In combination, a circuit which produces an output signal having one of two discrete levels in response to an interrogating signal of duration T; means for integrating said output signal; means for delaying said integrated signal an interval $T+\Delta T$; means for subtracting the delayed integrated signal from the undelayed integrated signal to produce a difference signal of duration $T+\Delta T$; and means for sensing the amplitude of said difference signal during the time interval between T and $T+\Delta T$.

9. The combination with a memory of: means for applying to the memory an interrogating pulse having a duration $T/2$ followed by an interrogating pulse of opposite polarity and having a duration $T/2$; means for integrating the output signal of the memory; means for delaying the integrated signal an interval $T+\Delta T$ and subtracting the signal thus delayed from the undelayed integrated signal to produce a difference signal; and means for sensing the amplitude of said difference signal during the time interval between T and $T+\Delta T$.

References Cited in the file of this patent

UNITED STATES PATENTS

| | | |
|---|---|---|
| 2,506,124 | White | May 2, 1950 |
| 2,523,283 | Dickson | Sept. 26, 1950 |
| 2,707,751 | Hance | May 3, 1955 |
| 2,835,882 | Beek | May 20, 1958 |
| 2,896,192 | Husman | July 21, 1959 |